Sept. 30, 1930.  R. E. DUNHAM  1,776,851
ROLLER PULVERIZER
Filed Sept. 23, 1929
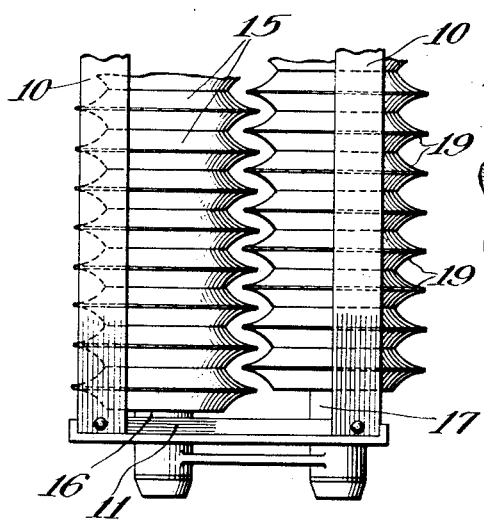
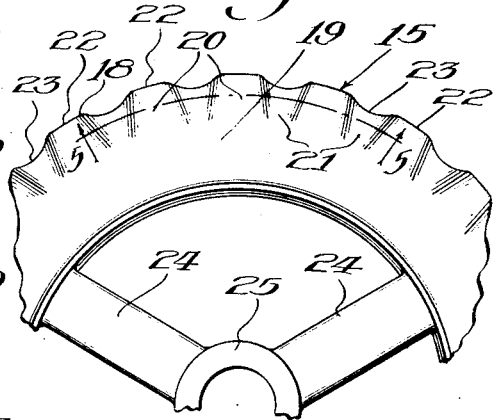
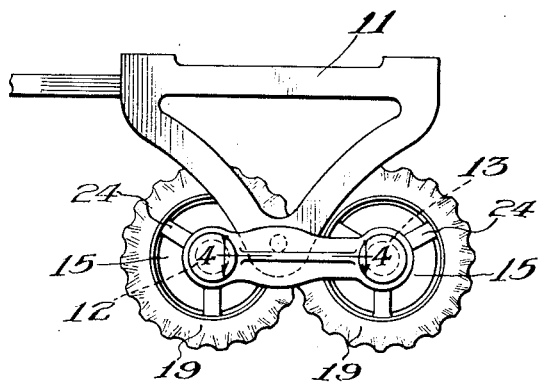
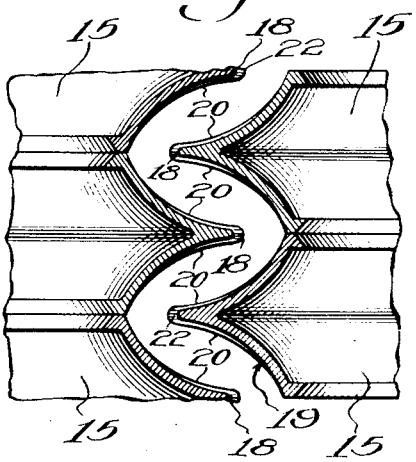
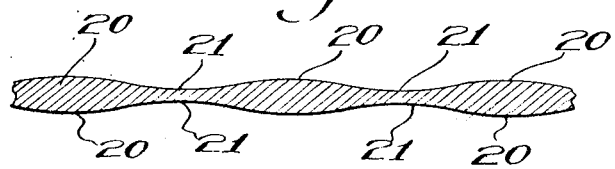
Inventor:
Ray E. Dunham,
By Banning & Banning
Attys Patented Sept. 30, 1930

1,776,851

UNITED STATES PATENT OFFICE

RAY E. DUNHAM, OF BEREA, OHIO, ASSIGNOR TO THE DUNHAM COMPANY, OF BEREA, OHIO, A CORPORATION OF OHIO

ROLLER PULVERIZER

Application filed September 23, 1929. Serial No. 394,407.

This invention relates to roller pulverizers and particularly to roller pulverizers which are provided with one or more gangs of roller disks, each disk having a beveled rim formation and the disks in unison constituting in effect a corrugated roller or rollers as the case may be.

One of the objects of the invention is to provide a roller pulverizer which possesses improved clod breaking capabilities.

A further object of the invention is to provide in a roller pulverizer, a gang of roller disks which tend to remove adhering soil from each other.

A further object of the invention is to provide a roller pulverizer comprising a plurality of gangs of roller disks, said gangs and disks being formed and arranged so that said disks tend to remove adhering soil from each other.

Other objects, advantages and capabilities will later more fully appear.

My invention further resides in the combination, construction and arrangements of parts illustrated in the accompanying drawing, and while I have shown herein a preferred embodiment I wish the same to be understood as illustrative only and not limiting the scope of my invention.

In the drawing:

Figure 1 is a detail plan illustrating the general relation and assembly of a roller pulverizer according to my invention, Fig. 2 is an end elevation thereof, Fig. 3 is a side elevation of a disk, partly broken away, Fig. 4 is a detail section on the line 4—4 of Fig. 2 on a larger scale showing the manner in which the disks of adjacent gangs are staggered and overlap, Fig. 5 is a developed section on the line 5—5 of Fig. 3 and on a larger scale.

Referring to the drawings, the pulverizer comprises a frame of which the cross bars 10 are shown in Fig. 1. From each end of said frame depends a fixed bracket 11 on which is pivotally mounted an oscillatory frame bar 12. Said frame bars are provided with journals for the reception of the axles 13 and 14 of the front and rear gangs of disks respectively. The disks 15 are freely mounted as a contiguous series on said axles 13 and 14 and are held against longitudinal movement thereon by means of bosses 16 and 17 on the oscillatory bars 12.

The disk 15 is of substantial thickness and the outer edges thereof are of substantially beveled formation so as to provide a central peripheral cutting edge 18. It will be understood that the term "beveled" is not used in a limitative sense, since the beveled surfaces 19 of the disk edge may be of frustro-conical shape or may be substantially curved so as to present a concave surface towards their exterior. As shown in the drawings the latter form is preferred.

Each surface 19 is waved or undulated along its periphery so as to provide it with alternating bellied portions 20 and depressions 21. The waved or undulated formation of the surfaces 19 preferably extends into the central cutting edge 18 so as to render said edge undulated in the peripheral direction. As shown in Fig. 3, the crests 22 of the cutting edge 18 are in the same axial plane as the projecting bellied portions 20, and the depressions 23 of the cutting edge are in the same axial plane as the depressions 21.

As shown in Fig. 4, the adjacent disks are adapted to bear against each other in assembled relation. The disks are preferably hollow and are preferably formed from cast iron with integral spokes 24 which give into integral hubs 25. A set of three spokes 24 and a hub 25 is preferably provided on each side of the disk. It is preferred to stagger the spokes on the opposite sides of each disk.

The disks of each gang are preferably in staggered relation, and the axles 13 and 14 are preferably so located that cutting edges 18 and the apical portions of the edges of the disks of each gang enter into the peripheral recesses formed by the beveled surfaces of the disks of the other gang as clearly shown in Figs. 1 and 4.

The improved form of disk employed in accordance with my invention possesses valuable properties in actual use. Thus, when a rim surface 19 is passing over a clod, the projecting portions 20 and the depressed portions 21 subject a clod to somewhat different pressures along the direction of travel, which causes an improved breaking or crumbling action. Furthermore, since the disks 15 are freely mounted on their axles, they will frequently move relatively, for example, when they meet unequal resistance or when turning etc. This relative movement will cause soil adhering to the disks to be subjected to vibration or repeated compressive forces due to the relative passage between the bellied portions 20 and depressions 21 of one disk and the corresponding bellied portions and depressions of the adjacent disk. This vibration or repeated compressive forces has a disintegrating or crumbling effect upon said soil which tends to remove same.

The disks of one gang exert a valuable soil removal effect on the disks of the other gang. It will readily be understood from Fig. 4 that the overlapping apical portions of the disks of one gang are moving upwardly, while the corresponding apical portions of the other gang are moving downwardly. This opposite movement causes the bellied portions 20 and depressions 21 of one gang to move rapidly past the corresponding bellied portions and depressions of the other gang so that soil engaged between said apical portions is subjected to positive vibration or repeated compressive forces so that it is crumbled and largely removed from the disks.

The cutting edge 18, being undulated in the peripheral direction, has also valuable functions in the operation of the machine. Thus, clods are engaged in the depressions 23 and prevented from moving out of the way of the cutting edge. Furthermore, the undulated form of the cutting edge 18 also assists in the removal of adhering soil and causes uneven pressure to be applied along its direction of travel thereby aiding in the breaking or crumbling of clods.

If desired, only one gang may be provided with disks having serrated edges, and the gangs may have disks of different sizes, but disks of the same size are preferred. For the sake of clearness, the serrations are exaggerated, particularly in Figs. 2 and 3.

I claim:

1. A soil pulverizer disk beveled to a central apical portion, the beveled surfaces of the rim being undulated in the peripheral direction.

2. A soil pulverizer disk beveled to a central cutting edge, the beveled surfaces of the rim and the cutting edge being undulated in the peripheral direction.

3. A soil pulverizer disk comprising a central apical portion and substantially beveled concave rim surfaces on either side thereof, said rim surfaces being undulated in the peripheral direction.

4. A soil pulverizer disk comprising a central apical portion and substantially beveled concave rim surfaces on either side thereof, said rim surfaces and central apical portion being undulated in the peripheral direction.

5. A soil pulzerizer comprising a gang of contiguous disks, each disk being beveled to a central apical portion, the beveled surfaces of the rim being undulated in the peripheral direction.

6. A soil pulverizer comprising a gang of contiguous disks, each disk being beveled to a central apical portion, the beveled surfaces of the rim and central apical portion, being undulated in the peripheral direction.

7. A soil pulverizer comprising a gang of contiguous disks, each disk comprising a central cutting edge and substantially beveled concave rim surfaces on either side thereof, said rim surfaces being undulated in the peripheral direction.

8. A soil pulverizer comprising a gang of contiguous disks, each disk comprising a central cutting edge and substantially beveled concave rim surfaces on either side thereof, said rim surfaces and cutting edge being undulated in the peripheral direction.

9. A soil pulverizer comprising a pair of gangs of contiguous disks which are beveled to a central apical portion, the disks of said gangs being staggered and having their apical portions in overlapping relation, the beveled surfaces of the rims on each side of said apical portion being undulated in the peripheral direction.

10. A soil pulverizer comprising a pair of gangs of contiguous disks which are beveled to a central apical portion, the disks of said gangs being staggered and having their apical portion in overlapping relation, the apical portion and the beveled surfaces of the rim on each side thereof being undulated in the peripheral direction.

11. A soil pulverizer comprising a pair of gangs of contiguous disks which are beveled to a central cutting edge, the disks of said gangs being staggered and having their cutting edges and apical portions in overlapping relation, the beveled rim surfaces being undulated in the peripheral direction.

12. A soil pulverizer comprising a pair of gangs of contiguous disks which are beveled to a central cutting edge, the disks of said gangs being staggered and having their cutting edges and apical portions in overlapping relation, the beveled rim surfaces and central cutting edge being undulated in the peripheral direction.

13. A soil pulverizer comprising a pair of gangs of contiguous disks which are beveled to a central cutting edge, the beveled rim surfaces being substantially concave, the disks of said gangs being staggered and having their cutting edges and apical portions in overlapping relation, the concave beveled rim surfaces and the central cutting edge being undulated in the peripheral direction.

14. A soil pulverizer disk having a rim beveled to an edge which lies in a plane, the beveled surfaces of the rim being undulated in the peripheral direction.

15. A soil pulverizer disk having a rim beveled to an edge which lies in a plane at right angles to the axis and located intermediate the sides of the disk, the beveled surfaces of the rim being undulated in the peripheral direction.

16. A soil pulverizer disk having a rim beveled to an edge which lies in a plane, the edge and beveled surfaces of the rim being undulated in the peripheral direction.

17. A soil pulverizer disk having a rim beveled to an edge which lies in a plane at right angles to the axis and located intermediate the sides of the disk, the edge and beveled surfaces of the rim being undulated in the peripheral direction.

In testimony whereof, I have hereunto set my hand this 19th day of September, 1929.

RAY E. DUNHAM.